(12) United States Patent
Ganz

(10) Patent No.: US 8,291,758 B2
(45) Date of Patent: Oct. 23, 2012

(54) MASTHEAD WIND DIRECTION INDICATOR ILLUMINATOR

(76) Inventor: Jonathan E. Ganz, Orangevale, CA (US)

( * ) Notice: Subject to any disclaimer, the term of this patent is extended or adjusted under 35 U.S.C. 154(b) by 402 days.

(21) Appl. No.: 12/798,771

(22) Filed: Apr. 10, 2010

(65) Prior Publication Data

US 2010/0257928 A1    Oct. 14, 2010

Related U.S. Application Data

(60) Provisional application No. 61/212,586, filed on Apr. 13, 2009.

(51) Int. Cl.
*G01P 13/00* (2006.01)
(52) U.S. Cl. ............... 73/170.06; 73/170.01; 73/170.03
(58) Field of Classification Search .................. None
See application file for complete search history.

(56) References Cited

U.S. PATENT DOCUMENTS

| 5,918,276 | A  | * | 6/1999  | Grindle et al. | 73/170.11 |
| 6,523,402 | B1 | * | 2/2003  | Hall et al.    | 73/170.02 |
| 7,454,968 | B2 | * | 11/2008 | Stein          | 73/170.01 |
| 7,516,657 | B2 | * | 4/2009  | Fan            | 73/170.01 |
| 7,591,176 | B2 | * | 9/2009  | Stein          | 73/170.01 |
| 8,091,420 | B2 | * | 1/2012  | Al Wehebi      | 73/170.01 |

* cited by examiner

*Primary Examiner* — Lisa Caputo
*Assistant Examiner* — Jermaine Jenkins

(57) ABSTRACT

The masthead wind direction indicator illuminator of the present invention provides three significant improvements over the prior art including elimination of wiring and switches, greatly extended lighting element life and automatic on/off control. Elimination of wiring and switches greatly reduces the complexity of the illuminator system, use of LED light source elements greatly increases the life of the illuminator, and use of a light sensitive switching element provides automatic control of the illuminator.

9 Claims, 3 Drawing Sheets

MASTHEAD WIND DIRECTION INDICATOR ILLUMINATOR

This non-provisional utility patent application claims the benefit under 35 USC 119(e) of provisional application 61/212,586 filed Apr. 13, 2009.

BRIEF DESCRIPTION

The subject of this invention relates to sailing vessels. Specifically, the disclosed invention presents an apparatus for illuminating the wind direction indicator mounted at the top of a mast. The improvement consists of eliminating the need for wiring and related controls such as remote switches. Additionally, the improvement greatly increases the time between required maintenance operations such as changing the light source.

BACKGROUND OF THE INVENTION

Sailing vessels have existed for centuries. While modern sailing vessels have taken advantage of the progress made in materials and methods science, the fundamental operation of a sailing vessel remains the same. That is, depending on wind conditions and direction, a sail or sails must be raised, lowered, or trimmed to optimize the performance of the craft. In order to properly operate such a vessel, the direction of the wind must be observed and reacted to on a real time basis. One common method for indicating the direction of the wind is a wind direction indicator mounted at the top of a mast. During daylight hours it is relatively easy to see the wind direction indicator, but at night some means must be used to make the determination. One method used to accomplish this is a light that illuminates the wind direction indicator mounted at the top of a mast.

Contemporary sailing vessels use some form of wind direction indicating device many of which are mounted at the top of the main mast. This direction indicating device generally takes the form of a vane, or an arrow that points toward the direction from which the wind is coming. As noted just above, during daylight hours this vane is quite easy to see, however, at night a light must be turned on to illuminate the vane.

Many types of vanes are in general use, but one common feature is that they all use a light source connected to some form of switch with wires running between the two for control. The switch is located in the cockpit so that a user can turn the light source on when required.

At this time, the majority of the light sources in use are of the incandescent lamp type which have a short service life when compared to alternative types of illuminators. Thus one disadvantage of the contemporary methods is that the light source has to be changed more often than with alternative types of illuminators. Also, because there are wires and switches involved, these too are susceptible to damage and need to be maintained from time to time.

What would be desirable would be an illuminator that would mitigate or, even better, eliminate the disadvantages. The present invention provides such a solution.

SUMMARY OF THE INVENTION

The masthead wind direction indicator illuminator of the present invention provides three significant improvements over the prior art including elimination of wiring and switches, greatly extended lighting element life and the addition of an automatic on/off control. Elimination of wiring and switches greatly reduces the complexity of the illuminator system, use of LED light source elements greatly increases the life of the illuminator, and use of a light sensitive switching element provides automatic control of the illuminator.

The apparatus of the present invention is contained in a single weather tolerant housing that is capable of being mounted on many of the contemporarily available brackets, or, alternatively, can be mounted on its own custom bracket. The housing mounts just beneath the wind direction indicator at the head of the mast and contains all components needed to illuminate the wind direction indicator under non-daylight conditions including a rechargeable power source, wind direction indicator illumination elements and a photo transistor switch to control the on/off function.

The power source is a battery connected to a solar cell array that charges the battery during daylight hours and provides current to the illuminating elements at night. The battery power is transferred to the illuminating elements via the photo transistor. The illuminating elements are white LEDs that provide sufficient candle power to illuminate the wind direction indicator at night. As will be evident from the detailed discussion below in conjunction with the figures and drawings, the apparatus of the present invention overcomes the disadvantages of the prior art.

DETAILED DESCRIPTION OF PREFERRED EMBODIMENTS

Figure 1:
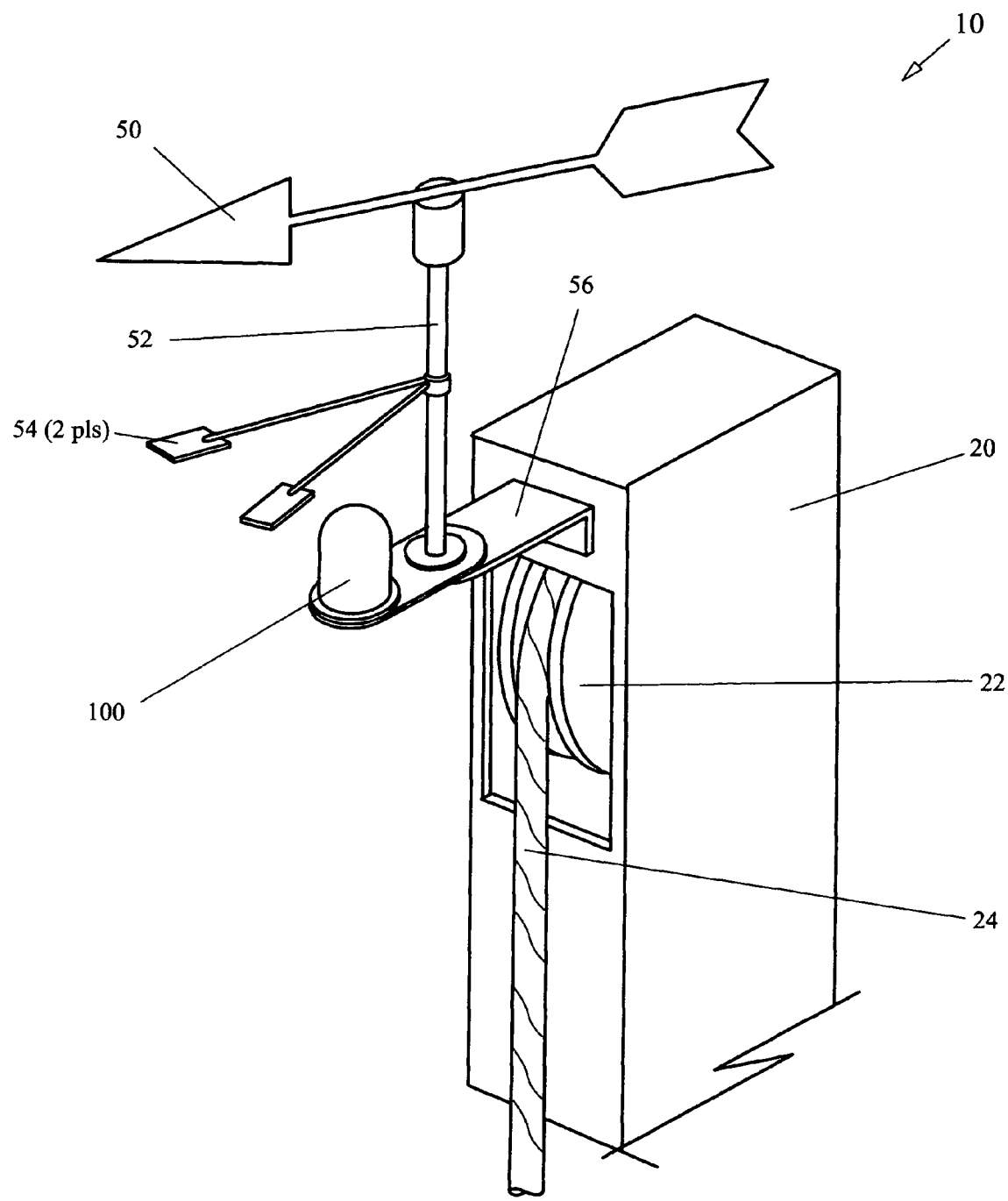
FIG. 1: is an isometric view of the apparatus of the present invention at the masthead.

As described briefly above, the apparatus of the present invention provides significant improvements over the prior art including illuminating element life and the addition of an automatic control of the on/off function. FIG. 1 provides an overview 10 of the apparatus.

A typical contemporary sailing vessel mast 20 includes one or more sheaves 22 and halyards 24 used to raise and lower the sails. A bracket 56 attaches to the head of the mast and is used to mount a wind direction indicator 50. The vane of the wind direction indicator 50 rotates about a shaft 52. Tabs 54 are oriented toward the stern of the craft serving as a fixed reference for the moving vane. Note that a detailed discussion of the direction indicator 50, the shaft 52 and the tabs 54 is not provided since they are not part of the invention and do not directly impinge on the apparatus or method of the present invention; however, the lack of such a detailed discussion should not be read as a limitation on the scope of the invention. Moreover, since these components are readily understood by those of skill in the art, the absence of such a detailed discussion has been purposely done for clarity. The improved masthead wind direction indicator illuminator of the present invention is contained within assembly 100.

Figure 2:
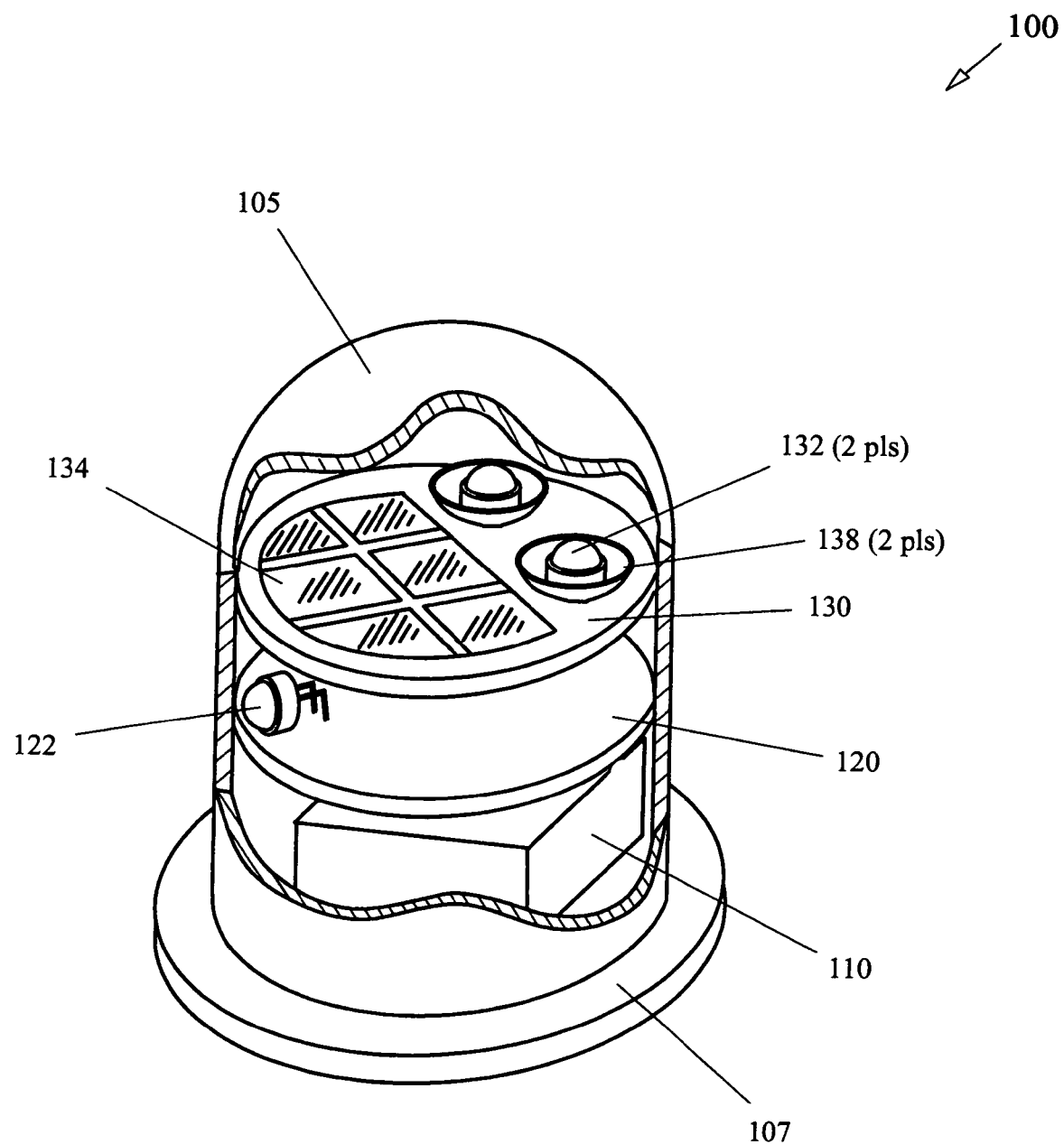
FIG. 2: is a sectional view of the apparatus of the present invention showing the main components.

FIG. 2 is a sectional view of assembly 100 showing the main components of the masthead wind direction indicator illuminator of the present invention. A weather-tolerant housing is formed by an inverted bell 105 that attaches to a stainless steel base 107. In a preferred embodiment the inverted bell 105 has an internal thread at the open end that mates with a threaded circular collar protruding upward from the stainless steel base 107. The attachment is made by threading the inverted bell 105 onto the stainless steel base 107 forming a weatherproof seal. However, it will be recognized that other sealing means could be used without departing from the spirit of the invention. By way of example, but not meant as a limitation, the seal could be formed through use of a gasket means.

The housing 105 in a preferred embodiment is made from clear glass, but it will be recognized that other clear materials, for example plastic, could be used as well. The key feature of the housing 105 is that it be transparent in order to allow the light from the illumination source to pass unimpeded to the wind direction indicator vane (50 of FIG. 1) and light from the sky to pass unimpeded to the photo transistor 122. Base 107 in turn is mechanically fixed to a bracket such that the illuminating elements, when power is applied, casts light upward to illuminate the wind direction indicator vane (50 of FIG. 1).

Inside the housing 105 a battery of sufficient amp hour capacity to illuminate the wind direction indicator for a period of 40 hours is connected to a first printed circuit board 120. In the preferred embodiment, the battery is a NP 1-6 six volt DC sealed lead acid type rated at 1.0 amp hour from Yuasa Batteries Inc., Laureldale, Pa. On the first printed circuit board 120 are the necessary components to control the two LED illuminating elements 132, discussed in detail below, including various resistors, capacitors and other electronic components which form a switching control means. Each of these components and the manner in which they are interconnected are well known in the art and are thus not discussed in detail to aid in clarity.

Also contained on the first printed circuit board 120 is light sensitive switching element 122. Light sensitive switching element 122 is mounted in such a way as to be enclosed within the housing 105 to protect it from weather and sea spray and is facing aft so that the shadow of the mast does not interfere with light sensing. Under daylight conditions, light sensitive switching element 122 is configured in such a way as to maintain the illuminating elements 132 in the off state. Once the daylight has become insufficient to maintain the illuminating elements 132 in the off state, light sensitive switching element 122 changes state and allows current from the battery 110 to pass to the illuminating elements 132 causing the indicator vane 50 of FIG. 1 to be illuminated. In a preferred embodiment the light sensitive switching element 122 is an OP501 photo transistor from TRW Optron, Farmington Hills, Mich., or its equivalent. However, as will be recognized by those skilled in the art, light sensitive switching element 122 could be any light activated switching means, for example, a photo resistor.

As mentioned above, the light sensitive switching element 122 causes the illuminating elements 132 to be off during daylight conditions, thus no power is being drained from the battery 110. The fact that the turning off of the illuminating elements 132 is automatic under daylight conditions is a significant improvement over contemporary systems. If the user should forget to turn off the control switch in a contemporary system, current from the house battery will continue to flow and, eventually, will completely discharge the battery leaving no power for auxiliary equipment. Should the user require battery power in an emergency, for example, to start a motor in order to avoid a hazard, none will be present.

During the off state of photo transistor 122, the battery 110 is being charged by a solar cell array 134 mounted to a second printed circuit board. As discussed below in detail, a charge control means is present on the first printed circuit board to insure that battery 110 does not become damaged. In this way the battery is maintained at complete charge level during the day, ready for discharge during the night hours.

Continuing with FIG. 2, a second printed circuit board 130 resides above the first circuit board 120 and contains the illuminating elements 132 and the solar cell array 134. It will be recognized that a single circuit board could be used to mount all required components without departing from the scope of the invention. For example, the discreet components could be mounted on one side of the printed circuit board while the illuminating elements and the solar cell array could be mounted on the opposite side. Thus the scope of the invention is limited only by the claims. It will also be recognized that more or fewer illuminating elements could be used. For example, a single high power LED could be used or, alternatively, an array of lower powered LEDs could be used, each configuration accomplishing the function of the invention.

In the preferred embodiment, the LEDs are part number 276-005 from Radio Shack, Fort Worth, Tex., rated at 28,500 mCD at 3.5 VDC and 20 mAmps. Each of the LEDs 132 is mounted on a polished aluminum reflector 138 such that each LED 132 is focused generally on the indicator vane 50 of FIG. 1. The reflectors 138 could be made from other materials, thus the use of aluminum is exemplary only and should not be read as a limitation on the invention.

Solar array 134 in the preferred embodiment is a RU6716 from Solarbotics Ltd., Calgary, Alberta, Canada. This array produces sufficient voltage and current to maintain the charge on battery 110. It will be recognized by those of skill in the art that other photovoltaic arrays could be used without departing from the spirit of the invention, thus the use of the RU6716 is exemplary only. As discussed in detail below in conjunction with FIG. 3, solar array 134 connects to a charge control means to insure that the battery 110 is damaged by overcharging. The charge control circuitry is not shown or described since the design and operation of such circuits are well known in the art.

Figure 3:
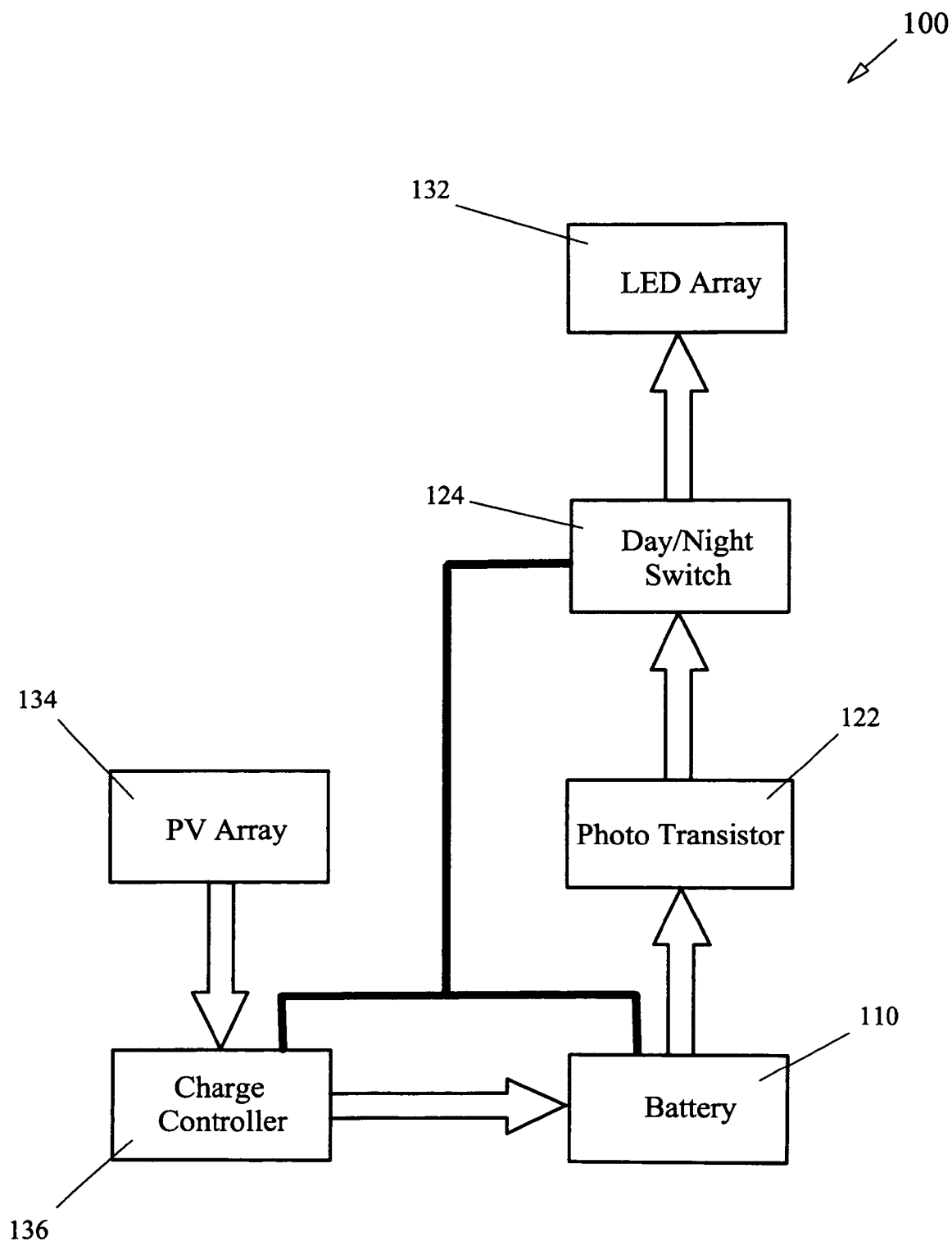
FIG. 3: is a block diagram of the apparatus of the present invention.

Looking now at FIG. 3, a block diagram of the present invention 100 is presented. Solar array 134, denominated as PV [photovoltaic] Array for brevity, is connected to Charge Controller 136. In a preferred embodiment the Charge Controller 136 is based upon a LM3622 integrated circuit from National Semiconductor Corp., Santa Clara, Calif., and related discrete components which together form the charge control means, but it will recognized that an off-the-shelf type controller could be used without departing from the spirit of the invention, thus the use of the discrete component design is exemplary only. Charge Controller 136 is connected to the battery 110. As described above, the purpose of the Charge Controller 136 is to protect the battery 110 from damage due to overcharging.

Battery 110 provides power to Photo Transistor 122 as well as to the discrete control electronics contained in the Charge Controller 136 and Day/Night Switch 124. The function of the Photo Transistor 122 is to react to ambient light conditions in such a way as to be off, or open circuited, during daylight hours and on, or closed circuited during nighttime hours. In the off state no power from the Battery 110 reaches the Day/Night Switch 124 except for low power control current. When Photo Transistor 122 is in the on state due to the loss of ambient light, for example, at dusk, current from the Battery 110 passes to the Day/Night Switch 124 and, in conjunction with control voltage already present, causes the Day/Night Switch 124 to pass current to LED Array 132. The LED Array 132 will remain lit until Photo Transistor 122 transitions to the off state in response to an increase in ambient light, for example, at dawn.

One advantage of the present invention is greatly extended life of the illuminating elements. An LED has an operational life in the range of 50,000 hours while a contemporary incandescent illuminator has only 750 hours. This significant improvement in operating life carries with it a significant reduction in maintenance costs and time.

A second advantage of the present invention is the elimination of wiring and remote switching. This improves the economics and also extends the time between maintenance operations due to the fact that the system is far less complex.

A third advantage of the present invention is the automatic operation. Because the apparatus of the present invention is capable of determining when to illuminate the wind direction indicator, the user of the craft need not maintain awareness and manually turn on, and more importantly, off the illuminating elements. This feature of the present invention improves the safety of the vessel since it reduces the task load of the user, allowing concentration on other operational tasks A fourth advantage of the present invention is energy savings and battery life protection. If the user should forget to turn off the control switch in a contemporary system, current from the house battery will continue to flow and, eventually, will completely discharge the battery leaving no power for auxiliary equipment.

A fifth advantage of the present invention is ease of retrofit. Since in many cases the proper mounting bracket is already present at the head of the mast, the user simply removes the old illumination device and attaches the present invention in its place. In those cases where no proper mount exists, a simple L-type bracket may be attached to the mast head and the present invention then mounted.

What is claimed is:

1. An improved masthead wind direction indicator illumination apparatus, the improvement comprising:
   a weatherproof housing, said weatherproof housing containing;
      a first circuit board, said first circuit board further comprised of;
         a light sensitive switching element;
         charge control means suitable for charging said battery during daytime light conditions;
         switching control means, said switching control means suitable for operating said light sensitive switching element;
      a second circuit board, said second circuit board further comprised of;
         a pair of LED light sources;
         a solar cell array, and;
      a battery wherein said first circuit board, said second circuit board and said battery are interconnected in such a way as to cause said pair of LED light sources, under control of said switching control means and said light sensitive switching element, to emit light under nighttime light conditions and remain unlit during daytime light conditions wherein said improvement further comprises the elimination of all interconnecting wiring and control means between said masthead wind direction indicator and a remote control station.

2. The improved masthead wind direction indicator illumination apparatus of claim 1 wherein said weatherproof comprises:
   a stainless steel base, said stainless steel base having a top surface and a bottom surface with a threaded circular collar protruding upward from said top surface, and;
   an inverted bell-shaped container, said bell-shaped container having a thread on the open end, said thread sized to mate with said thread on said collar of said stainless steel base such that when said inverted bell-shaped container is threadably mated with said stainless steel base a weatherproof seal is formed.

3. The improved masthead wind direction indicator illumination apparatus of claim 2 wherein said bell-shaped container is made of glass.

4. The improved masthead wind direction indicator illumination apparatus of claim 2 wherein said bell-shaped container is made from plastic.

5. The improved masthead wind direction indicator illumination apparatus of claim 1 wherein said battery is lithium-ion.

6. The improved masthead wind direction indicator illumination apparatus of claim 1 wherein said battery is nickel-metal-hydride.

7. The improved masthead wind direction indicator illumination apparatus of claim 1 wherein said battery is sealed lead-acid.

8. The improved masthead wind direction indicator illumination apparatus of claim 1 wherein said light sensitive switching element is a photo transistor.

9. The light sensitive switching element of claim 1 wherein said light sensitive switching element is a photo resistor.

* * * * *